United States Patent
Torita et al.

(10) Patent No.: US 11,121,376 B2
(45) Date of Patent: Sep. 14, 2021

(54) POSITIVE ELECTRODE, NON-AQUEOUS ELECTROLYTE SECONDARY BATTERY, AND METHOD OF PRODUCING POSITIVE ELECTRODE

(71) Applicant: TOYOTA JIDOSHA KABUSHIKI KAISHA, Toyota (JP)

(72) Inventors: Koji Torita, Nagoya (JP); Akihiro Ochiai, Toyonaka (JP); Yusuke Fukumoto, Toyonaka (JP); Harunari Shimamura, Toyonaka (JP); Takuya Asari, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 16/381,256

(22) Filed: Apr. 11, 2019

(65) Prior Publication Data
US 2019/0319273 A1 Oct. 17, 2019

(30) Foreign Application Priority Data
Apr. 13, 2018 (JP) .............................. JP2018-077599

(51) Int. Cl.
*H01M 4/66* (2006.01)
*H01M 4/04* (2006.01)
(Continued)

(52) U.S. Cl.
CPC ......... *H01M 4/664* (2013.01); *H01M 4/0404* (2013.01); *H01M 4/661* (2013.01);
(Continued)

(58) Field of Classification Search
CPC .... H01M 4/664; H01M 4/0404; H01M 4/661; H01M 4/525; H01M 4/583; H01M 10/0525; H01M 2004/028
See application file for complete search history.

(56) References Cited

U.S. PATENT DOCUMENTS

2012/0026645 A1* 2/2012 Sakakura ............... H01G 9/145
361/505
2013/0071759 A1* 3/2013 Yamaki ............. H01M 10/0569
429/332
(Continued)

FOREIGN PATENT DOCUMENTS

JP 2000-048822 A 2/2000
JP 2008-103132 A 5/2008

OTHER PUBLICATIONS

EPO machine generated English translation of JP 2008-103132 (Year: 2008).*

*Primary Examiner* — Christopher P Domone
*Assistant Examiner* — Kimberly Wyluda
(74) *Attorney, Agent, or Firm* — Sughrue Mion, PLLC

(57) ABSTRACT

A positive electrode includes at least a positive electrode current collector and a positive electrode active material layer. The positive electrode current collector includes an aluminum foil and an aluminum hydrated oxide film. The aluminum hydrated oxide film covers a surface of the aluminum foil. The positive electrode active material layer is formed on a surface of the aluminum hydrated oxide film. The aluminum hydrated oxide film has a thickness not smaller than 50 nm and not greater than 1000 nm. The aluminum hydrated oxide film contains at least one selected from the group consisting of phosphorus, fluorine, and sulfur.

20 Claims, 8 Drawing Sheets

(51) Int. Cl.
*H01M 4/583* (2010.01)
*H01M 10/0525* (2010.01)
*H01M 4/525* (2010.01)
*H01M 4/02* (2006.01)

(52) U.S. Cl.
CPC ............ *H01M 4/525* (2013.01); *H01M 4/583* (2013.01); *H01M 10/0525* (2013.01); *H01M 2004/028* (2013.01)

(56) References Cited

U.S. PATENT DOCUMENTS

2020/0144604 A1* 5/2020 Takahashi ................ H01M 4/13
2021/0057754 A1* 2/2021 Hayashi ................. H01G 11/50

* cited by examiner

POSITIVE ELECTRODE, NON-AQUEOUS ELECTROLYTE SECONDARY BATTERY, AND METHOD OF PRODUCING POSITIVE ELECTRODE

This nonprovisional application claims priority to Japanese Patent Application No. 2018-077599 filed on Apr. 13, 2018, with the Japan Patent Office, the entire contents of which are hereby incorporated by reference.

BACKGROUND

Field

The present disclosure relates to a positive electrode, a non-aqueous electrolyte secondary battery, and a method of producing a positive electrode.

Description of the Background Art

Japanese Patent Laying-Open No. 2000-048822 discloses a positive electrode current collector of a non-aqueous electrolyte secondary battery.

SUMMARY

As a positive electrode current collector of a non-aqueous electrolyte secondary battery (which may be simply referred to as "battery" hereinafter), an aluminum (Al) foil is used.

When a short circuit is caused in a battery by, for example, an impact exerted from outside the battery (hereinafter, the impact or the like is also called "external input") and if the positive electrode current collector (an Al foil, which has a low resistance) comes into direct contact with the negative electrode, a large short-circuit current may flow. As a result, heat generation may be increased. The "short circuit caused by an external input" may be simulated by, for example, a nail penetration test. Hereinafter, the "short circuit caused by an external input" may be simply referred to as "short circuit".

If a ceramic film, for example, is formed on a surface of the Al foil, heat generation occurring upon a short circuit may be decreased. It may be because the ceramic film, which has a resistance higher than that of the Al foil, mitigates direct contact between the Al foil and the negative electrode.

In Japanese Patent Laying-Open No 2000-048822, ceramic film formation on a surface of the Al foil is carried out by so-called boehmite treatment. More specifically, the Al foil is heated in an aqueous triethanolamine solution and thereby an Al hydrated oxide film is formed on a surface of the Al foil. The Al hydrated oxide film may mitigate direct contact between the Al foil and the negative electrode. However, an ordinary Al hydrated oxide film formed by boehmite treatment tends to be hard and thereby poorly resistant to impact.

When an external input is applied to the positive electrode and a foreign body penetrates it, the positive electrode may receive impact. The impact may cause cracks and/or the like in the Al hydrated oxide film. These cracks and/or the like in the Al hydrated oxide film may increase the extent of heat generation.

An object of the present disclosure is to mitigate heat generation that occurs in a battery upon a short circuit caused by, for example, an impact exerted from outside the battery.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A positive electrode for a non-aqueous electrolyte secondary battery is provided. The positive electrode includes at least a positive electrode current collector and a positive electrode active material layer. The positive electrode current collector includes an aluminum foil and an aluminum hydrated oxide film. The aluminum hydrated oxide film covers a surface of the aluminum foil. The positive electrode active material layer is formed on a surface of the aluminum hydrated oxide film. The aluminum hydrated oxide film has a thickness not smaller than 50 nm and not greater than 1000 nm. The aluminum hydrated oxide film contains at least one selected from the group consisting of phosphorus, fluorine, and sulfur.

In the positive electrode according to the present disclosure, the Al hydrated oxide film covers a surface of the Al foil. The Al hydrated oxide film contains at least one selected from the group consisting of phosphorus (P), fluorine (F), and sulfur (S). P, F, and/or S may cause structural defects in the Al hydrated oxide crystals. The structural defects may render the Al hydrated oxide film flexible. As a result, the Al hydrated oxide film may have impact strength and, thereby, impact-induced cracks and/or the like may be mitigated. Consequently, heat generation occurring upon a short circuit caused by, for example, an impact exerted from outside the battery may be mitigated.

The Al hydrated oxide film has a thickness not smaller than 50 nm and not greater than 1000 nm. As for the configuration in which the thickness of the Al hydrated oxide film is smaller than 50 nm, it is unclear at this point whether heat generation occurring upon a short circuit can be mitigated. In the configuration in which the thickness of the Al hydrated oxide film is greater than 1000 nm, battery capacity may decrease non-negligibly. It may be because the Al hydrated oxide film of that thickness occupies a great amount of space within the battery.

[2] The ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film may be not lower than 0.1 mass %. With this ratio, an increased level of heat-generation-mitigating effect may be obtained.

[3] The aluminum hydrated oxide film may have a thickness not smaller than 100 nm. With this thickness, an increased level of heat-generation-mitigating effect may be obtained.

[4] A non-aqueous electrolyte secondary battery according to the present disclosure includes at least the positive electrode according to any one of [1] to [3] above and a negative electrode. Within the battery according to the present disclosure, heat generation occurring upon a short circuit may be mitigated. It may be because the Al hydrated oxide film mitigates direct contact between the Al foil and the negative electrode.

[5] A method of producing a positive electrode according to the present disclosure is a method of producing a positive electrode for a non-aqueous electrolyte secondary battery.

The method of producing a positive electrode according to the present disclosure includes at least (A) to (C) below:

(A) preparing an aluminum foil;

(B) forming an aluminum hydrated oxide film on a surface of the aluminum foil by heating the aluminum foil in an aqueous solution to produce a positive electrode current collector; and (C) forming a positive electrode active material layer on a surface of the aluminum hydrated oxide film to produce a positive electrode.

The aqueous solution contains at least one selected from the group consisting of a phosphorus compound, a fluorine compound, and a sulfur compound dissolved therein.

Boehmite treatment (which is the treatment ordinarily employed) uses an aqueous triethanolamine solution or the like (see Japanese Patent Laying-Open No. 2000-048822, for example). On the other hand, the method of producing a positive electrode according to the present disclosure uses an aqueous solution containing at least one selected from the group consisting of a phosphorus compound, a fluorine compound, and a sulfur compound dissolved therein. As a result, at least one selected from the group consisting of P, F, and S may be introduced into the Al hydrated oxide film.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The description below does not limit the scope of claims. For example, the below description is mainly on a lithium-ion secondary battery. However, a lithium-ion secondary battery is merely an example of the non-aqueous electrolyte secondary battery according to the present embodiment. As long as the non-aqueous electrolyte secondary battery according to the present embodiment includes a non-aqueous electrolyte, the non-aqueous electrolyte secondary battery according to the present embodiment is not limited to a lithium-ion secondary battery. For example, the non-aqueous electrolyte secondary battery according to the present embodiment may be a sodium-ion secondary battery.

<Positive Electrode>

Figure 1:
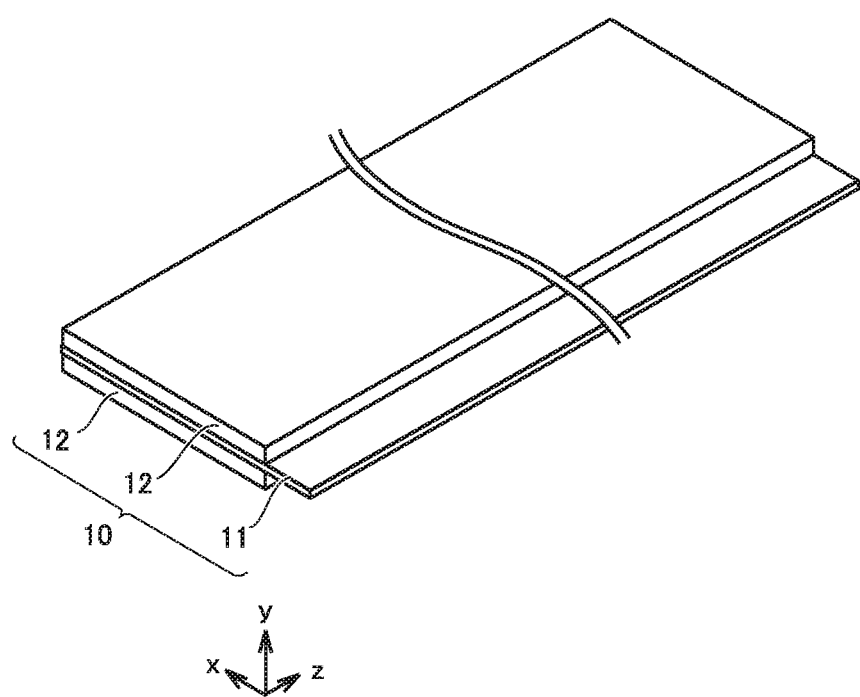
FIG. 1 is a schematic view illustrating the structure of the positive electrode according to the present embodiment.

FIG. 1 is a schematic view illustrating the structure of a positive electrode according to the present embodiment.

A positive electrode 10 is a positive electrode for a non-aqueous electrolyte secondary battery. The non-aqueous electrolyte secondary battery is described below in detail. Positive electrode 10 is in sheet form. Positive electrode 10 includes at least a positive electrode current collector 11 and a positive electrode active material layer 12. Positive electrode active material layer 12 may be formed on both sides of positive electrode current collector 11. The part of positive electrode current collector 11 protruding from positive electrode active material layer 12 in the x-axis direction in FIG. 1 may be used for connection to a positive electrode terminal 91 (described below).

<<Positive Electrode Current Collector>>

Figure 2:
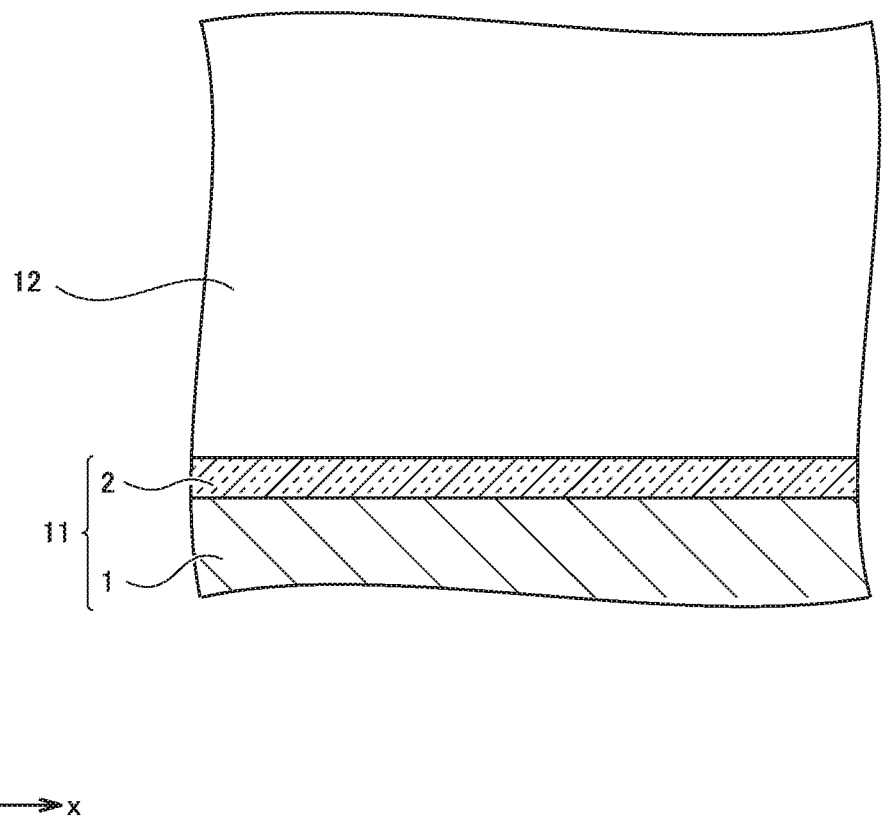
FIG. 2 is a conceptual sectional view illustrating the structure of the positive electrode according to the present embodiment.

FIG. 2 is a conceptual sectional view illustrating the structure of the positive electrode according to the present embodiment.

Positive electrode current collector 11 includes an Al foil 1 and an Al hydrated oxide film 2.

<Aluminum Foil>

Al foil 1 may be a pure Al foil, for example. Al foil 1 may be an Al alloy foil, for example. Al foil 1 may contain Al in an amount not lower than 99 mass %, for example. Al foil 1 may contain, for example, a trace amount of impurities and the like that are inevitably entrapped during production. Al foil 1 may contain an alloying element, for example. The alloying element may be silicon (Si), iron (Fe), copper (Cu), manganese (Mn), magnesium (Mg), zinc (Zn), and/or titanium (Ti), for example. Al foil 1 may contain only one type of the alloying element. Al foil 1 may contain two or more types of the alloying element.

As Al foil 1, a sheet of a material or materials specified by Alloy Nos. 1085, 1070, 1050, 1N30, 1100, 3003, 3004, 8021, and/or 8079 in "JIS H 4160: Aluminium and aluminium alloy foils" may be used, for example. Al foil 1 may have a thickness not smaller than 5 μm and not greater than 50 μm, for example. Al foil 1 may have a thickness not smaller than 10 μm and not greater than 20 μm, for example.

<Aluminum Hydrated Oxide Film>

Al hydrated oxide film 2 covers a surface of Al foil 1. Desirably, Al hydrated oxide film 2 covers substantially the entire surface of Al foil 1. As long as heat generation occurring upon a short circuit can be mitigated, however, part of the surface of Al foil 1 may be not covered with Al hydrated oxide film 2. In other words, Al hydrated oxide film 2 may cover at least part of Al foil 1.

(Film Thickness)

Al hydrated oxide film 2 has a thickness not smaller than 50 nm and not greater than 1000 nm. As for the configuration in which the thickness of Al hydrated oxide film 2 is smaller than 50 nm, it is unclear at this point whether heat generation occurring upon a short circuit can be mitigated. In the configuration in which the thickness of Al hydrated oxide film 2 is greater than 1000 nm, battery capacity may decrease non-negligibly. It may be because Al hydrated oxide film 2 of that thickness occupies a great amount of space within the battery.

The "thickness of Al hydrated oxide film 2" is measured in a cross-sectional micrograph of Al hydrated oxide film 2. A microscope suitable for the subject of observation is used. The microscope may be a scanning electron microscope (SEM). The microscope may be a transmission electron microscope (TEM). The cross section is substantially parallel to the thickness direction of Al hydrated oxide film 2 (namely, the y-axis direction in FIG. 2). The expression "(the cross section is) substantially parallel to the thickness direction" means that the angle formed between the cross section and the thickness direction is not smaller than 0 degree and not greater than 10 degrees. The cross-sectional sample may be prepared by using a cross section polisher apparatus (CP) or a focused ion beam apparatus (FIB), for example. The magnification may be changed, as appropriate, depending on the thickness of Al hydrated oxide film 2. The magnification may be not lower than 10,000 times and not higher than 200,000 times, for example. The thickness is measured at 20 positions. The arithmetic mean of these 20 thickness measurements is used. Desirably, the distance between these 20 positions is not smaller than 100 nm, for example.

Al hydrated oxide film 2 may have a thickness not smaller than 100 nm, for example. With this thickness, an increased level of heat-generation-mitigating effect may be obtained. Al hydrated oxide film 2 may have a thickness not smaller than 300 nm, for example. Al hydrated oxide film 2 may have a thickness not greater than 600 nm, for example. In the configuration in which the thickness is within these ranges, an improved balance may be obtained between, for example, the heat-generation-mitigating effect and the battery resistance.

(Composition)

Al hydrated oxide film 2 contains an Al hydrated oxide. The composition of the Al hydrated oxide may be identified by, for example, x-ray diffraction (XRD).

The composition of the Al hydrated oxide may be represented by, for example, the following formula (I):

$$Al_2O_3 \cdot nH_2O \quad (I)$$

(where n satisfies 0<n≤1).

As shown in the above formula (I), the Al hydrated oxide contains water of crystallization ($H_2O$). When heat generation occurs in battery 100, the Al hydrated oxide releases water of crystallization and thereby heat generation may be mitigated. The compound of the above formula (I) where n=1 is also called "boehmite". The compound of the above formula (I) where n=0 is also called "alumina".

The Al hydrated oxide is a main component of Al hydrated oxide film 2. The term "main component" herein refers to a component the content of which in Al hydrated oxide film 2 is not lower than 50 mass %. For example, the content of Al hydrated oxide in Al hydrated oxide film 2 may be not lower than 70 mass %. For example, the content of Al hydrated oxide in Al hydrated oxide film 2 may be not lower than 80 mass %. For example, the content of Al hydrated oxide in Al hydrated oxide film 2 may be not lower than 90 mass %. For example, the content of Al hydrated oxide in Al hydrated oxide film 2 may be not lower than 95 mass %. For example, the content of Al hydrated oxide in Al hydrated oxide film 2 may be not lower than 99 mass %. For example, the content of Al hydrated oxide in Al hydrated oxide film 2 may be not lower than 99.9 mass %. For example, the content of Al hydrated oxide in Al hydrated oxide film 2 may be not higher than 99.95 mass %.

In the present embodiment, the Al hydrated oxide crystals have structural defects introduced therein. As a result, Al hydrated oxide film 2 may be flexible compared to a boehmite film (the ordinary film) and may also have impact strength.

Al hydrated oxide film 2 contains at least one selected from the group consisting of P, F, and S (hereinafter, the element is also called "additive element"). The above-mentioned structural defects may be attributable to the additive element. The presence of the additive element within Al hydrated oxide film 2 may be checked by x-ray photoelectron spectroscopy (XPS) and/or XRD, for example.

Each of P, F, and S may readily combine with an oxygen (O) radical. An O radical may be involved in the occurrence and continuation of combustion reaction. With P, F, and/or S contained in Al hydrated oxide film 2, combustion reaction may be mitigated. The mitigation of combustion reaction may decrease heat generation.

Within Al hydrated oxide film 2, the additive element may form a compound. For example, aluminum phosphate, aluminum fluoride, aluminum sulfate, and/or the like may be detected by XRD analysis of a surface of Al hydrated oxide film 2. More specifically, Al hydrated oxide film 2 may contain at least one selected from the group consisting of aluminum phosphate, aluminum fluoride, and aluminum sulfate. For example, Al hydrated oxide film 2 may contain the Al hydrated oxide in an amount not lower than 70 mass % and lower than 100 mass % with the remainder being made up of at least one selected from the group consisting of aluminum phosphate, aluminum fluoride, and aluminum sulfate.

The ratio of the total mass of the additive element contained in Al hydrated oxide film 2 to the sum of the total mass of the additive element contained in Al hydrated oxide film 2 and the mass of Al contained in Al hydrated oxide film 2 (hereinafter, this ratio is also called "addition ratio") may be not lower than 0.05 mass %, for example. The addition ratio may be not lower than 0.1 mass %, for example. With the addition ratio being not lower than 0.1 mass %, an increased level of heat-generation-mitigating effect may be obtained.

The addition ratio is calculated by the following formula:

$$\text{Addition ratio(unit, mass \%)} = (M_P + M_F + M_S)/(M_P + M_F + M_S + M_{Al}) \times 100.$$

In the above formula, $M_P$ represents the mass of P; $M_F$ represents the mass of F; $M_S$ represents the mass of S; and $M_{Al}$ represents the mass of Al. $M_P$, $M_F$, $M_S$, and $M_{Al}$ are measured by XPS. Measurement of each of $M_P$, $M_F$, $M_S$, and $M_{Al}$ is carried out at least three times. The arithmetic mean of these at least three measurements is used.

The addition ratio may be not lower than 1 mass %/o, for example. The addition ratio may be not higher than 5 mass %, for example. The heat-generation-mitigating effect of the additive element may saturate at an addition ratio of about 5 mass %. Therefore, the addition ratio higher than 5 mass % may be uneconomical. However, the addition ratio may be equal to or higher than 5 mass % because there is still a possibility at that addition ratio that the heat-generation-mitigating effect might increase as the addition ratio increases. For example, the addition ratio may be equal to or higher than 10 mass %.

For example, the addition ratio may be not higher than 30 mass %. This is because formation of Al hydrated oxide film 2 may be carried out by heat treatment in an aqueous solution containing an additive (such as a phosphorus compound) dissolved therein, as described below, and dissolving in the aqueous solution the additive in an amount high enough to achieve an addition ratio higher than 30 mass % may be difficult.

In addition, increasing the concentration of the additive can increase the viscosity of the aqueous solution and thereby, for example, decrease efficiency in producing Al hydrated oxide film 2. In other words, an addition ratio higher than 30 mass % may be undesirable from the productivity viewpoint. However, the addition ratio may be higher than 30 mass % because the heat-generation-mitigating effect may still be obtained at an addition ratio higher than 30 mass %.

(Dynamic Hardness)

Being moderately flexible, Al hydrated oxide film 2 may have impact strength and may be less likely to be cracked. The flexibility of Al hydrated oxide film 2 may be expressed by dynamic hardness, for example. It is considered that as the dynamic hardness decreases, the flexibility of Al hydrated oxide film 2 increases A boehmite film (the ordinary film) may have a dynamic hardness not lower than 250, for example. On the other hand, Al hydrated oxide film 2 according to the present embodiment may have a dynamic hardness not higher than 210, for example. It may be because Al hydrated oxide film 2 has structural defects introduced therein.

The "dynamic hardness" is measured with a microhardness tester. For example, a microhardness tester PICODENTOR (registered trademark) HM500 manufactured by Fischer Instruments K. K. may be used. A tester that is equivalent to this microhardness tester may also be used.

A predetermined indenter is prepared. The indenter is a triangular pyramidal indenter (ridge angle, 115 degrees). The indenter is made of diamond, for example. On the sample stage of the microhardness tester, a sample is placed. As the sample, positive electrode current collector 11 (a combination of Al foil 1 and Al hydrated oxide film 2) is used. In the case in which positive electrode active material layer 12 is formed on a surface of positive electrode current collector 11, positive electrode active material layer 12 is removed from a surface of positive electrode current collector 11 (Al hydrated oxide film 2). For easy removal of positive electrode active material layer 12, it is desirable that positive electrode active material layer 12 have been moistened with a solvent. The solvent may be N-methyl-2-pyrrolidone (NMP) and/or ethanol, for example. The removal of positive electrode active material layer 12 may be carried out with a spatula, for example. At the time of removal, force should be applied to Al hydrated oxide film 2 carefully so as not to break Al hydrated oxide film 2.

The indenter is pressed into the sample. Once the indenter has come into contact with the sample, a test force (unit, mN) is applied to the sample at a constant loading speed (unit, mN/sec). The test force is increased to reach a preset maximum test force, which is then maintained for ten seconds. After a lapse often seconds, the test force is released at a constant unloading speed (unit, mN/sec). The unloading speed is the same as the loading speed.

Figure 3:
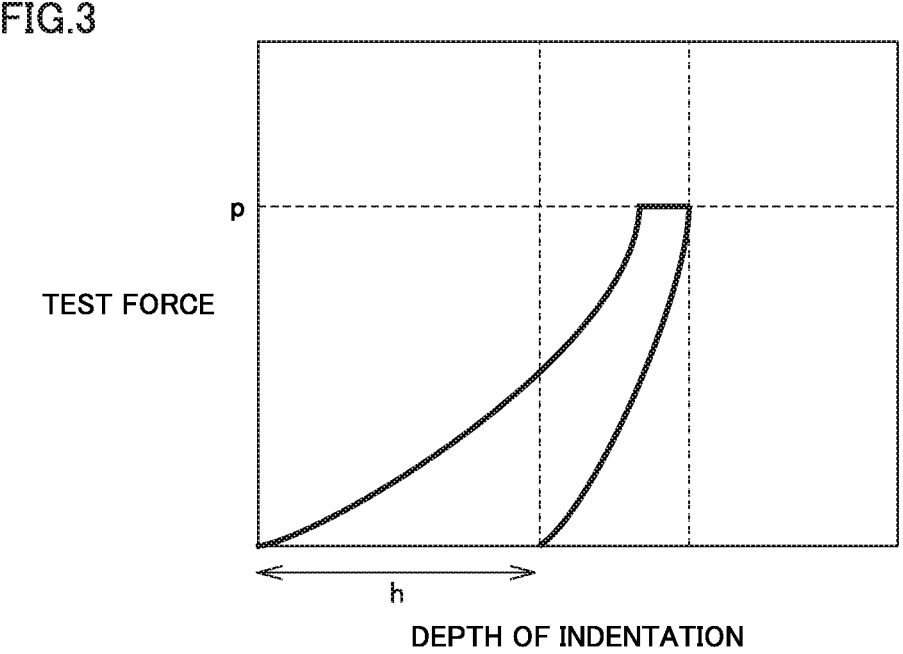
FIG. 3 is a graph describing the method of measuring dynamic hardness.

FIG. 3 is a graph describing the method of measuring dynamic hardness.

FIG. 3 illustrates the test force applied to the indenter to press the indenter into the sample, in relation to the depth of indentation (pressed depth). From the graph, the depth (h) of indentation caused by plastic deformation is read.

The dynamic hardness is calculated by the following formula:

$$\text{Dynamic hardness} = a \times p/h^2.$$

In the above formula, "a" represents a coefficient that depends on the shape of the indenter; "a" in the present embodiment is 37.838; "p" represents the maximum test force; and "h" represents the depth of indentation caused by plastic deformation. Measurement of the dynamic hardness is carried out at least three times. The arithmetic mean of these at least three measurements is used.

For example, the dynamic hardness of Al hydrated oxide film 2 may be not higher than 200. With this dynamic hardness, an increased level of heat-generation-mitigating effect may be obtained. For example, the dynamic hardness of Al hydrated oxide film 2 may be not higher than 100. For example, the dynamic hardness of Al hydrated oxide film 2 may be not higher than 75. For example, the dynamic hardness of Al hydrated oxide film 2 may be not higher than 25. With such a dynamic hardness, an increased level of heat-generation-mitigating effect may be obtained.

For example, the dynamic hardness of Al hydrated oxide film 2 may be not lower than 10. With this dynamic hardness, direct contact between Al foil 1 and positive electrode active material layer 12 may be mitigated even at the time of, for example, compression of positive electrode 10. In the configuration in which Al foil 1 is not in direct contact with positive electrode active material layer 12, an increased level of heat-generation-mitigating effect may be obtained.

(Specific Volume Resistance)

When Al hydrated oxide film 2 has structural defects introduced therein, the specific volume resistance of Al hydrated oxide film 2 tends to be decreased. As a result, Al hydrated oxide film 2 may have a specific volume resistance high enough to enable mitigation of an increase in short-circuit current and low enough to allow smooth electronic conduction between Al foil 1 and positive electrode active material layer 12. For example, the specific volume resistance of Al hydrated oxide film 2 may be not lower than $10^6$ Ω·cm and not higher than $10^{10}$ Ω·cm.

Figure 4:
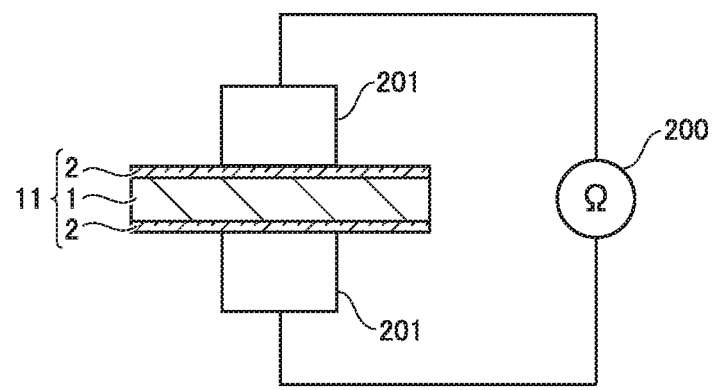
FIG. 4 is a conceptual view illustrating the method of measuring specific volume resistance.

FIG. 4 is a conceptual view illustrating the method of measuring specific volume resistance.

As the sample, positive electrode current collector 11 (a combination of Al foil 1 and Al hydrated oxide film 2) is used. Before measurement, positive electrode active material layer 12 is removed from a surface of positive electrode current collector 11 (Al hydrated oxide film 2). The removal of positive electrode active material layer 12 may be carried out by, for example, the process described above in the paragraph in section "Dynamic hardness" that discusses the measurement method. The sample is prepared so as to have planar dimensions of 2 cm or greater in length and 2 cm or greater in width.

An ohmmeter 200 is prepared. Ohmmeter 200 may be a typical ohmmeter. Desirably, ohmmeter 200 is capable of measuring electrical resistance of the order of milliohms. Between two test terminals 201, the sample (positive electrode current collector 11) is inserted. The electrical resistance is measured with ohmmeter 200.

The specific volume resistance is calculated by the following formula:

$$\text{Specific volume resistance(unit, Ω·cm)} = r \times \{s/(2 \times t \times 10^7)\}.$$

In the above formula, r (unit, Ω) represents the electrical resistance measured with ohmmeter 200; s (unit, $cm^2$)

represents the area of the tip of test terminal 201 (namely, the area of test terminal 201 in contact with the sample); s in the present embodiment is 4 cm$^2$ (=2 cm×2 cm); and t (unit, nm) represents the thickness of Al hydrated oxide film 2. The method of measuring the thickness (t) of Al hydrated oxide film 2 is described above.

Compared to the specific volume resistance of Al hydrated oxide film 2, the specific volume resistance of Al foil 1 may be small and negligible. Therefore, the specific volume resistance calculated by the above formula may be regarded as substantially equal to the specific volume resistance of Al hydrated oxide film 2. For example, the specific volume resistance of Al hydrated oxide film 2 may be not higher than 10$^9$ Ω·cm. For example, the specific volume resistance of Al hydrated oxide film 2 may be not higher than 10$^8$ Ω·cm. For example, the specific volume resistance of Al hydrated oxide film 2 may be not higher than 10$^7$ Ω·cm. With such a specific volume resistance, a decrease in battery resistance may be obtained, for example.

<<Positive Electrode Active Material Layer>>

Positive electrode active material layer 12 is formed on a surface of positive electrode current collector 11. More specifically, positive electrode active material layer 12 is formed on a surface of Al hydrated oxide film 2. Positive electrode active material layer 12 may have a thickness not smaller than 10 μm and not greater than 200 μm, for example. Positive electrode active material layer 12 may have a thickness not smaller than 100 μm and not greater than 200 μm, for example.

<Positive Electrode Active Material>

Positive electrode active material layer 12 contains at least a positive electrode active material. Typically, the positive electrode active material is a group of particles. The positive electrode active material may have a d50 not lower than 1 μm and not higher than 30 μm, for example. The "d50" refers to the particle size in volume-based particle size distribution at which the cumulative particle volume (accumulated from the side of small sizes) reaches 50% of the total particle volume. The volume-based particle size distribution may be measured with a laser-diffraction particle size distribution analyzer, for example.

The positive electrode active material is not particularly limited. The positive electrode active material may have any of various crystal structures. The crystal structure of the positive electrode active material may be identified by XRD, for example. The positive electrode active material may have a crystal structure of a lamellar rock salt type, a spinel type, or an olivine type, for example. The positive electrode active material may be lithium cobalt oxide (LiCoO$_2$), lithium nickel oxide (LiNiO$_2$), lithium manganese oxide (such as LiMnO$_2$ and LiMn$_2$O$_4$), lithium nickel cobalt manganese oxide (such as LiNi$_{1/3}$Co$_{1/3}$Mn$_{1/3}$O$_2$ and LiNi$_{0.5}$Co$_{0.2}$Mn$_{0.3}$O$_2$), lithium nickel cobalt aluminate (such as LiNi$_{0.82}$Co$_{0.15}$Al$_{0.03}$O$_2$), and/or lithium iron phosphate (LiFePO$_4$), for example. Positive electrode active material layer 12 may contain only one type of the positive electrode active material. Positive electrode active material layer 12 may contain two or more types of the positive electrode active material.

<Conductive Material>

Positive electrode active material layer 12 may further contain a conductive material. The conductive material is not particularly limited. The conductive material may be carbon black (such as acetylene black, furnace black, and thermal black) and/or carbon short fibers, for example. Positive electrode active material layer 12 may contain only one type of the conductive material. Positive electrode active material layer 12 may contain two or more types of the conductive material. The content of the conductive material may be, for example, not lower than 0.1 part by mass and not higher than 10 parts by mass relative to 100 parts by mass of the positive electrode active material.

<Binder>

Positive electrode active material layer 12 may further contain a binder. The binder binds positive electrode current collector 11 and positive electrode active material layer 12 to each other. The binder binds the constituents of positive electrode active material layer 12 to each other. The binder is not particularly limited. The binder may be polyvinylidene difluoride (PVdF), polytetrafluoroethylene (PTFE), carboxymethylcellulose (CMC), and/or polyacrylic acid (PAA), for example. Positive electrode active material layer 12 may contain only one type of the binder. Positive electrode active material layer 12 may contain two or more types of the binder. The content of the binder may be, for example, not lower than 0.1 part by mass and not higher than 10 parts by mass relative to 100 parts by mass of the positive electrode active material.

<Method of Producing Positive Electrode>

Next, the method of producing a positive electrode according to the present embodiment is described.

Figure 5:
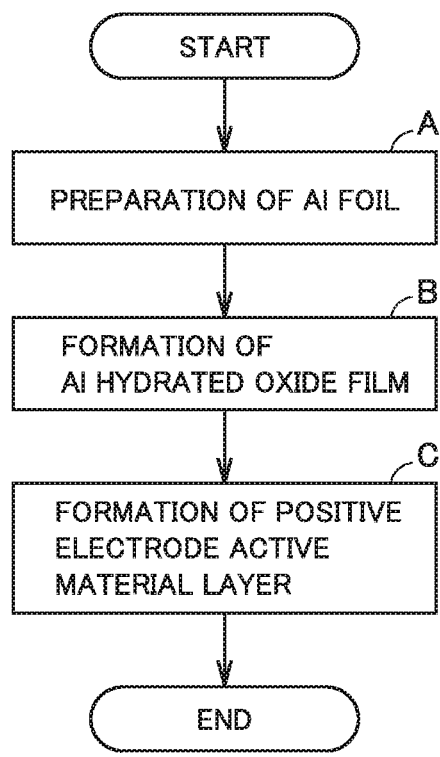
FIG. 5 is a flow chart schematically illustrating the method of producing a positive electrode according to the present embodiment.

FIG. 5 is a flow chart schematically illustrating the method of producing a positive electrode according to the present embodiment.

The method of producing a positive electrode according to the present embodiment includes at least "(A) preparation of an Al foil", "(B) formation of an Al hydrated oxide film", and "(C) formation of a positive electrode active material layer".

<<(A) Preparation of Al Foil>>

The method of producing a positive electrode according to the present embodiment includes preparing Al foil 1. Al foil 1 is described above in detail. Al foil 1 may be prepared by purchasing a commercial equivalent for Al foil 1 or by producing Al foil 1.

<<(B) Formation of Al Hydrated Oxide Film>>

The method of producing a positive electrode according to the present embodiment includes forming Al hydrated oxide film 2 on a surface of Al foil 1 by heating Al foil 1 in an aqueous solution to produce positive electrode current collector 11.

Al foil 1 is immersed in the aqueous solution. Al foil 1 is heated in the aqueous solution, and thereby hydrothermal reaction occurs on a surface layer of Al foil 1. As a result, the surface layer of Al foil 1 may be converted into Al hydrated oxide film 2. The resulting Al hydrated oxide film 2 grows. In the present embodiment, the aqueous solution contains an additive dissolved therein and therefore Al hydrated oxide film 2 may have structural defects introduced therein.

The aqueous solution may be prepared by, for example, dissolving the additive in ion-exchanged water and/or the like. The additive is at least one selected from the group consisting of a phosphorus compound, a fluorine compound, and a sulfur compound. In other words, the aqueous solution according to the present embodiment contains at least one selected from the group consisting of a phosphorus compound, a fluorine compound, and a sulfur compound dissolved therein. The additive may cause introduction of at least one selected from the group consisting of P, F, and S into Al hydrated oxide film 2.

The phosphorus compound refers to a water-soluble compound that contains P. With the phosphorus compound dissolved in the aqueous solution, P may be introduced into Al hydrated oxide film 2. The phosphorus compound may be polyphosphate, Hishicolin (registered trademark), guanidine phosphate, and/or ammonium dihydrogen phosphate ($NH_4H_2PO_4$), for example.

In the case in which $NH_4H_2PO_4$ and/or the like is used as the additive, heating may cause ammonia volatilization and, as a result, substantially no nitrogen (N) may be introduced into Al hydrated oxide film 2.

The fluorine compound refers to a water-soluble compound that contains F. With the fluorine compound dissolved in the aqueous solution, F may be introduced into Al hydrated oxide film 2. The fluorine compound may be ammonium fluoride ($NH_4F$), for example. Instead of ammonium fluoride, a mixture of ammonium chloride and sodium fluoride, for example, may be used.

The sulfur compound refers to a water-soluble compound that contains S. With the sulfur compound dissolved in the aqueous solution, S may be introduced into Al hydrated oxide film 2. The sulfur compound may be guanidine sulfamate and/or ammonium sulfate [$(NH_4F)_2SO_4$], for example.

The aqueous solution may contain only one type of the additive dissolved therein. The aqueous solution may contain two or more types of the additive dissolved therein. For example, the aqueous solution may contain at least one selected from the group consisting of polyphosphate, Hishicolin (registered trademark), guanidine phosphate, ammonium dihydrogen phosphate, ammonium fluoride, a mixture of ammonium chloride and sodium fluoride, guanidine sulfamate, and ammonium sulfate dissolved therein.

By changing the addition ratio of an additive element (P, F. S) in Al hydrated oxide film 2, the dynamic hardness, the specific volume resistance, and the like of Al hydrated oxide film 2 may be adjusted. The addition ratio may be adjusted by changing, for example, the concentration of the additive in the aqueous solution. In the configuration in which the aqueous solution contains two or more types of the additive dissolved therein, the concentration of the additive refers to the total concentration of all the additive contained. The higher the concentration of the additive is, the higher the addition ratio tends to be. For example, the concentration of the additive may be not lower than 0.05 mass %. For example, the concentration of the additive may be not lower than 0.1 mass %. For example, the concentration of the additive may be not lower than 1 mass %. For example, the concentration of the additive may be not lower than 5 mass %. For example, the concentration of the additive may be not lower than 10 mass %.

For example, the concentration of the additive may be not higher than 30 mass %. With the concentration of the additive being not higher than 30 mass %, easy preparation of the aqueous solution, for instance, may be achieved. In addition, the resulting decrease in the viscosity of the aqueous solution may lead to, for instance, an improved efficiency in producing Al hydrated oxide film 2. For example, the concentration of the additive may be not higher than 20 mass %.

The aqueous solution may further contain a dehydrating additive (such as sulfuric acid) dissolved therein. With the use of the dehydrating additive, an Al hydrated oxide represented by the above formula (I) in which n is smaller than 1 may be produced. The smaller the value of n in the above formula (I) is, the higher the dynamic hardness tends to be. The dynamic hardness of Al hydrated oxide film 2 may be adjusted to a moderate value by adjusting both the extent of flexibility imparted by structural defect introduction and the extent of hardness imparted by dehydration.

The heating temperature may be not lower than 70° C. and not higher than 100° C., for example. The heating temperature refers to the temperature of the aqueous solution being heated. The temperature of the aqueous solution may be measured with a typical thermometer.

The thickness of Al hydrated oxide film 2 may be adjusted by changing, for example, the heating duration. The longer the heating duration is, the greater the thickness of Al hydrated oxide film 2 tends to be. For example, the heating duration may be not shorter than 1 minute. For example, the heating duration may be not shorter than 2 minutes. For example, the heating duration may be not shorter than 5 minutes. For example, the heating duration may be not shorter than 10 minutes. For example, the heating duration may be not longer than 60 minutes. For example, the heating duration may be not longer than 20 minutes.

By forming Al hydrated oxide film 2, positive electrode current collector 11 may be produced. To positive electrode current collector 11, a deposit of the additive may be adhered. The deposit may be removed by, for example, rinsing positive electrode current collector 11 with ion-exchanged water and/or the like.

<<(C) Formation of Positive Electrode Active Material Layer>>

The method of producing a positive electrode according to the present embodiment includes forming positive electrode active material layer 12 on a surface of positive electrode current collector 11 to produce positive electrode 10.

For example, a positive electrode active material, a conductive material, a binder, and a solvent may be mixed to prepare a slurry. The resulting slurry may be applied to a surface of positive electrode current collector 11, followed by drying, to form positive electrode active material layer 12. In the application process, a typical applicator may be used. In the drying process, a typical dryer may be used. The positive electrode active material and the like are described above in detail. Positive electrode active material layer 12 may be formed in a predetermined region on a surface of positive electrode current collector 11 so as to meet the specifications of battery 100.

After positive electrode active material layer 12 is formed (namely, after the slurry is dried), positive electrode 10 may be compressed. Compression of positive electrode 10 may be carried out with, for example, rollers. Then, positive electrode 10 may be cut into predetermined planar dimensions so as to meet the specifications of battery 100. In this way, positive electrode 10 according to the present embodiment may be produced.

<Non-Aqueous Electrolyte Secondary Battery>

Next, the non-aqueous electrolyte secondary battery according to the present embodiment is described.

Figure 6:
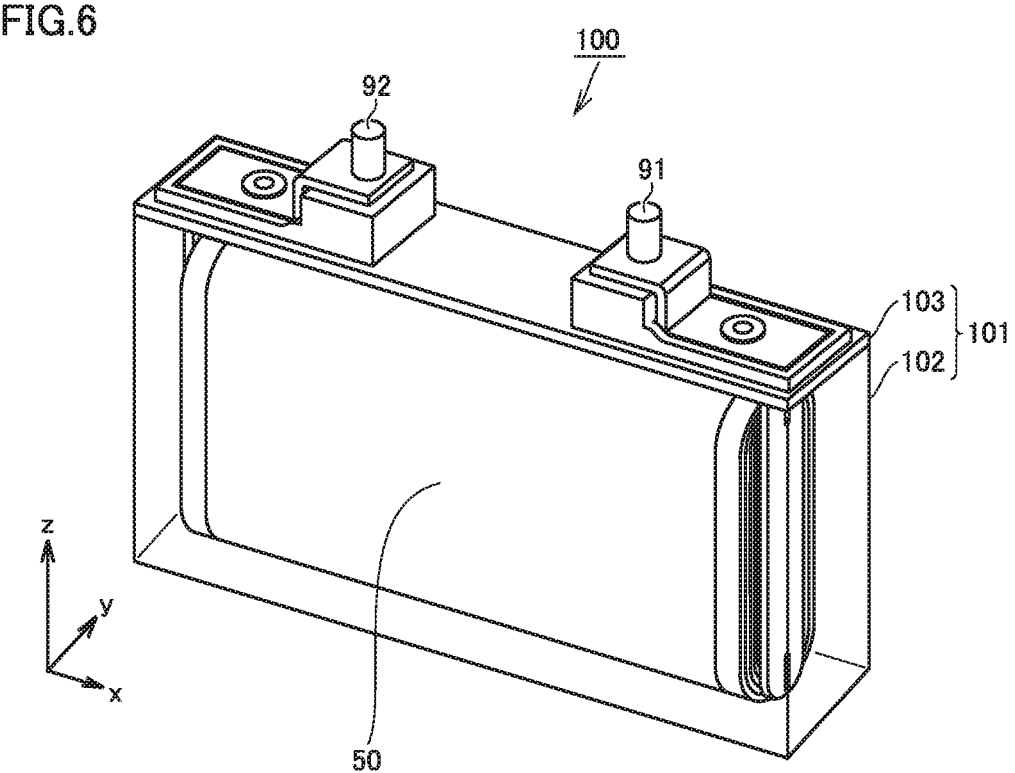
FIG. 6 is a schematic view illustrating the structure of the non-aqueous electrolyte secondary battery according to the present embodiment.

FIG. 6 is a schematic view illustrating the structure of the non-aqueous electrolyte secondary battery according to the present embodiment.

Battery 100 is a non-aqueous electrolyte secondary battery. Battery 100 includes a casing 101. Casing 101 is hermetically sealed. Casing 101 is prismatic (a flat, rectangular parallelepiped). Alternatively, casing 101 may be cylindrical, for example. Casing 101 may be, for example, a pouch made of an aluminum-laminated film.

Casing 101 includes a container 102 and a cap 103. Cap 103 is bonded to container 102 by, for example, laser beam welding. Cap 103 is equipped with positive electrode terminal 91 and a negative electrode terminal 92. Cap 103 may be further equipped with a liquid inlet, a gas-discharge valve, and a current interrupt device (CID), for example.

Casing 101 accommodates an electrode array 50 and a non-aqueous electrolyte (not shown).

Figure 7:
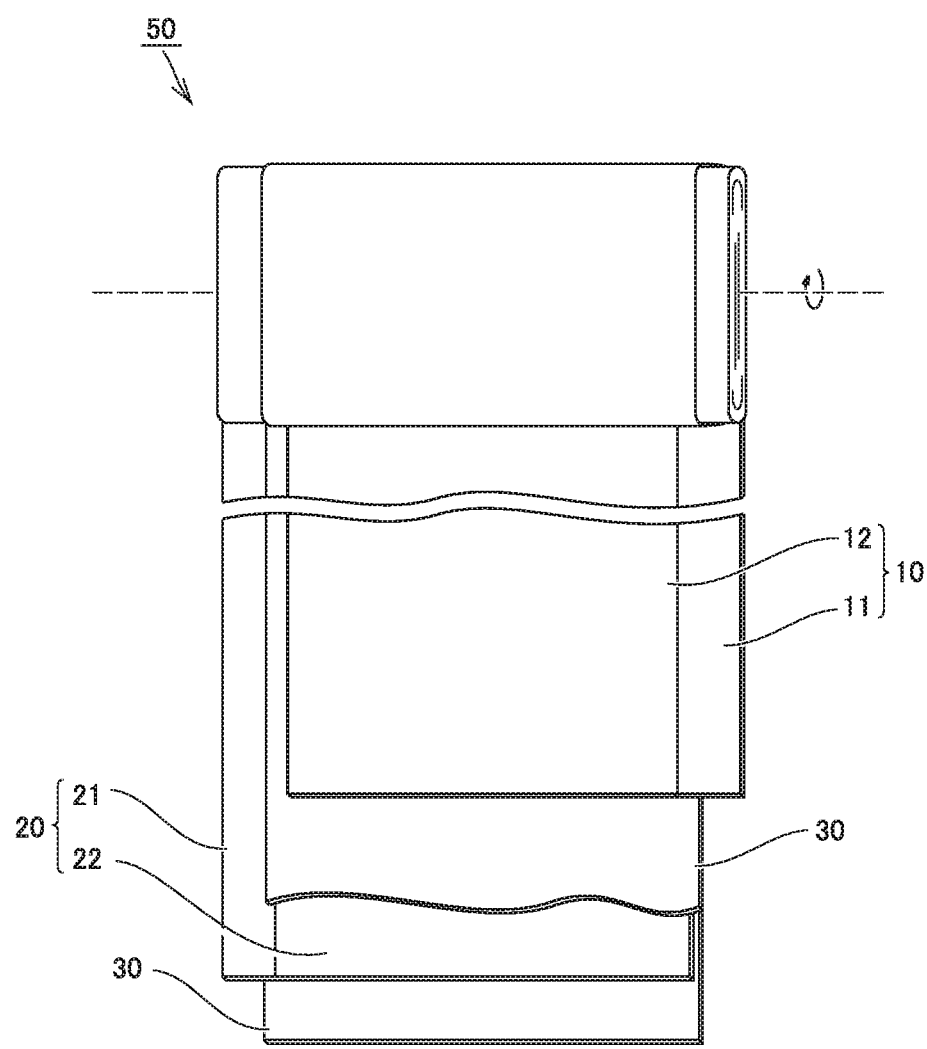
FIG. 7 is a schematic view illustrating the structure of an electrode array according to the present embodiment.

FIG. 7 is a schematic view illustrating the structure of the electrode array according to the present embodiment.

Electrode array 50 is a wound-type one. Electrode array 50 is formed by stacking positive electrode 10, a separator 30, a negative electrode 20, and separator 30 in this order and then winding them in a spiral fashion. In other words, battery 100 includes at least positive electrode 10 and negative electrode 20. Positive electrode 10 is described above in detail. Because battery 100 includes positive electrode 10 according to the present embodiment, heat generation occurring upon a short circuit may be mitigated.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

<<Negative Electrode>>

Figure 8:
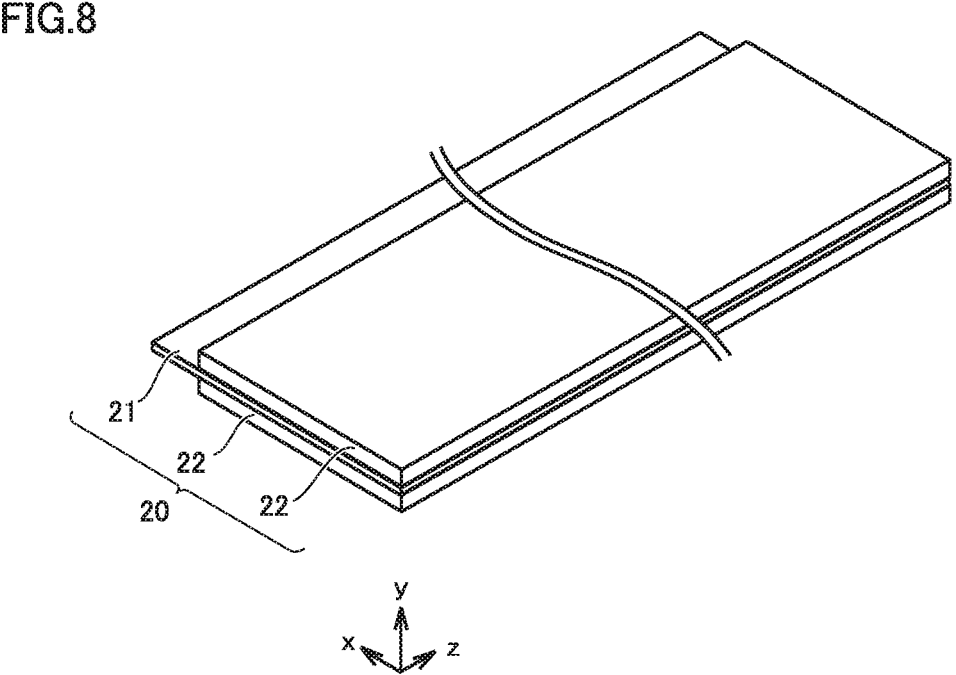
FIG. 8 is a schematic view illustrating the structure of the negative electrode according to the present embodiment.

FIG. 8 is a schematic view illustrating the structure of the negative electrode according to the present embodiment.

Negative electrode 20 is in sheet form. Negative electrode 20 includes a negative electrode current collector 21 and a negative electrode active material layer 22. Negative electrode active material layer 22 is formed on a surface of negative electrode current collector 21. Negative electrode active material layer 22 may be formed on both sides of negative electrode current collector 21.

Negative electrode current collector 21 may be made of copper (Cu) foil, for example. Negative electrode current collector 21 may have a thickness not smaller than 5 μm and not greater than 50 μm, for example. The part of negative electrode current collector 21 protruding from negative electrode active material layer 22 in the x-axis direction in FIG. 8 may be used for connection to negative electrode terminal 92 (FIG. 6).

Negative electrode active material layer 22 may have a thickness not smaller than 10 μm and not greater than 200 μm, for example. Negative electrode active material layer 22 contains at least a negative electrode active material. Negative electrode active material layer 22 may further contain a binder.

Typically, the negative electrode active material is a group of particles. The negative electrode active material may have a d50 not lower than 1 μm and not higher than 30 μm, for example. The negative electrode active material is not particularly limited. The negative electrode active material may be graphite, soft carbon, hard carbon, silicon, silicon oxide, silicon-based alloy, tin, tin oxide, tin-based alloy, lithium (elementary substance), and/or lithium alloy (such as Li—Al alloy), for example. Negative electrode active material layer 22 may contain only one type of the negative electrode active material Negative electrode active material layer 22 may contain two or more types of the negative electrode active material.

The binder is not particularly limited. The binder may be CMC and/or styrene-butadiene rubber (SBR), for example. The content of the binder may be, for example, not lower than 0.1 part by mass and not higher than 10 parts by mass relative to 100 parts by mass of the negative electrode active material.

<<Separator>>

Battery 100 may include separator 30. Separator 30 is interposed between positive electrode 10 and negative electrode 20. Separator 30 separates positive electrode 10 and negative electrode 20 from each other. Separator 30 is a porous film. Separator 30 is electrically insulating. Separator 30 may have a thickness not smaller than 5 μm and not greater than 50 μm, for example. Separator 30 may be made of polyolefin, for example.

Separator 30 may be made of polyethylene (PE), for example. Separator 30 may be made of polypropylene (PP), for example. Separator 30 may have a monolayer structure, for example. Separator 30 may consist of a porous PE film, for example. Separator 30 may have a multilayer structure, for example. Separator 30 may be formed by, for example, stacking a porous PP film, a porous PE film, and a porous PP film in this order. Separator 30 may have a heat-resistant layer on a surface thereof. The heat-resistant layer contains a heat-resistant material. The heat-resistant material may be alumina, boehmite, titania, silica, and/or polyimide, for example.

In the configuration in which the non-aqueous electrolyte is solid (namely, in the configuration in which battery 100 is an all-solid-state battery), separator 30 may be substantially unnecessary.

<<Non-Aqueous Electrolyte>>

Battery 100 includes a non-aqueous electrolyte. The non-aqueous electrolyte according to the present embodiment is a Li-ion conductor. The non-aqueous electrolyte may be liquid, for example. The non-aqueous electrolyte may be gel, for example. The non-aqueous electrolyte may be solid, for example. The liquid non-aqueous electrolyte may be an electrolyte solution or an ionic liquid, for example. In the present specification, the non-aqueous electrolyte in the form of electrolyte solution is described as an example.

The electrolyte solution contains at least a Li salt and a solvent. The Li salt is dissolved in the solvent. The concentration of the Li salt may be not lower than 0.5 mol/L and not higher than 2 mol/L (not lower than 0.5 M and not higher than 2 M), for example. The Li salt may be $LiPF_6$, $LiBF_4$, $LiN(FSO_2)_2$, and/or $LiN(CF_3SO_2)_2$, for example. The electrolyte solution may contain only one type of the Li salt. The electrolyte solution may contain two or more types of the Li salt.

The solvent is aprotic. The solvent may be a mixture of a cyclic carbonate and a chain carbonate, for example. The mixing ratio may be, for example, "(cyclic carbonate):(chain carbonate)=1:9 to 5:5 (volume ratio)".

The cyclic carbonate may be ethylene carbonate (EC), propylene carbonate (PC), butylene carbonate (BC), and/or fluoroethylene carbonate (FEC), for example. The solvent may contain only one type of the cyclic carbonate. The solvent may contain two or more types of the cyclic carbonate.

The chain carbonate may be dimethyl carbonate (DMC), ethyl methyl carbonate (EMC), and/or diethyl carbonate (DEC), for example. The solvent may contain only one type of the chain carbonate. The solvent may contain two or more types of the chain carbonate.

The solvent may contain a lactone, a cyclic ether, a chain ether, and/or a carboxylic acid ester, for example. The lactone may be γ-butyrolactone (GBL) and/or δ-valerolactone, for example. The cyclic ether may be tetrahydrofuran (THF), 1,3-dioxolane, and/or 1,4-dioxane, for example. The chain ether may be 1,2-dimethoxyethane (DME), for example. The carboxylic acid ester may be methyl formate (MF), methyl acetate (MA), and/or methyl propionate (MP), for example.

The electrolyte solution may further contain various additives in addition to the Li salt and the solvent. The electrolyte solution may contain the additives in an amount not lower than 0.005 mol/L, and not higher than 0.5 mol/L, for example. Examples of the additives include a gas generation agent (also called "anti-overcharging additive"), a solid electrolyte interface (SEI) film-forming agent, and a flame retardant. The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiPO_2F_2$, propane sultone (PS), and/or ethylene sulfite (ES), for example. The flame retardant may be a phosphoric acid ester and/or a phosphazene, for example.

EXAMPLES

Next, examples according to the present disclosure are described. The description below does not limit the scope of claims.

Example 1

1. Production of Positive Electrode
1-1. (A) Preparation of Al Foil
Al foil 1 having a belt shape (Alloy No. 1085, with a thickness of 15 μm) was prepared. Al foil 1 had a width dimension (dimension in the x-axis direction in FIG. 1) of 130 mm.

1-2. (B) Formation of Al Hydrated Oxide Film
As an additive, ammonium dihydrogen phosphate ($NH_4H_2PO_4$) was prepared. Ammonium dihydrogen phosphate was dissolved in ion-exchanged water, and thus an aqueous solution was prepared. The concentration of the additive was 10 mass %.

Al foil 1 was immersed in the aqueous solution. Al foil 1 in the aqueous solution was heated. The heating temperature (the temperature of the aqueous solution) was 90° C. The heating duration was two minutes. As a result, Al hydrated oxide film 2 was formed on a surface of Al foil 1. In other words, positive electrode current collector 11 was produced. Positive electrode current collector 11 was rinsed with ion-exchanged water. Al hydrated oxide film 2 had a thickness of 100 nm. Al hydrated oxide film 2 contained P. The addition ratio of P was 10 mass %.

1-3. (C) Formation of Positive Electrode Active Material Layer
The materials described below were prepared
Positive electrode active material: lithium nickel cobalt manganese oxide (with a crystal structure of a lamellar rock salt type)
Conductive material: acetylene black (powder)
Binder: PVdF
Solvent: N-methyl-2-pyrrolidone The positive electrode active material, the conductive material, the binder, and the solvent were mixed, and thus a slurry was prepared. The resulting slurry was applied to the surface (both sides) of positive electrode current collector 11, followed by drying, and thus positive electrode active material layer 12 was formed. In this way, positive electrode 10 was produced. Positive electrode 10 was a belt-shaped sheet. Positive electrode 10 was compressed with rollers.

Positive electrode active material layer 12 had the following composition: "(positive electrode active material): (conductive material):binder=98:1:1 (mass ratio)".

Positive electrode active material layer 12 had a weight per unit area (mass per unit area) of 25 mg/cm². Positive electrode active material layer 12 had a width dimension (dimension in the x-axis direction in FIG. 1) of 110 mm.

<Production of Non-Aqueous Electrolyte Secondary Battery>
2. Production of Negative Electrode
The materials described below were prepared.
Negative electrode active material: natural graphite
Binder: CMC and SBR
Solvent: ion-exchanged water
Negative electrode current collector: Cu foil having a belt shape (10 μm in thickness and 132 mm in width dimension)

The width dimension refers to the dimension in the x-axis direction in FIG. 8.

The negative electrode active material, the binder, and the solvent were mixed, and thus a slurry was prepared. The resulting slurry was applied to the surface (both sides) of negative electrode current collector 21, followed by drying, and thus negative electrode active material layer 22 was formed. Negative electrode active material layer 22 had a weight per unit area of 20 mg/cm². Negative electrode active material layer 22 had a width dimension (dimension in the x-axis direction in FIG. 8) of 112 mm. In this way, negative electrode 20 was produced. Negative electrode 20 was a belt-shaped sheet.

3. Preparation of Separator
As separator 30, a porous PE film (120 mm in width dimension and 20 μm in thickness) was prepared. As a heat-resistant material, alumina (powder) was prepared. The heat-resistant material, a binder, and a solvent were mixed, and thus a slurry was prepared. The resulting slurry was applied to a surface of separator 30, followed by drying, and thus a heat-resistant layer was formed. The resulting heat-resistant layer had a thickness of 4 μm. In this way, separator 30 was prepared.

4. Preparation of Electrolyte Solution
An electrolyte solution was prepared. The electrolyte solution had a composition described below.
Li salt: $LiPF_6$ (concentration, 1 mol/L)
Solvent: [EC:EMC:DEC=3:4:3 (volume ratio)]

5. Assembly
Positive electrode 10, separator 30, negative electrode 20, and separator 30 were stacked in this order and then wound in a spiral fashion. Thus, electrode array 50 was formed.

Casing 101 was prepared. Casing 101 was prismatic. Casing 101 had the following outer dimensions: 75 mm in height dimension, 120 mm in width dimension, and 15 mm in depth dimension. The height dimension refers to the dimension in the z-axis direction in FIG. 6. The width dimension refers to the dimension in the x-axis direction in FIG. 6. The depth dimension refers to the dimension in the y-axis direction in FIG. 6. Casing 101 had a wall thickness of 1 mm.

To electrode array 50, positive electrode terminal 91 and negative electrode terminal 92 were connected. In casing 101, electrode array 50 was placed. Into casing 101, the electrolyte solution was injected. Casing 101 was hermetically sealed. Thus, battery 100 (non-aqueous electrolyte secondary battery) was produced. Battery 100 included at least positive electrode 10 and negative electrode 20. Battery 100 was designed to have a rated capacity of 5 Ah within a voltage range of 3.0 to 4.1 V.

6. Charge and Discharge for Completing Battery Production
Battery 100 was charged to 4.2 V at a rate of 1 C in an environment at a temperature of 25° C. At a rate of 1 C, charging to the rated capacity completes in one hour. After five minutes of resting, battery 100 was discharged to 3.0 V at a rate of 1 C.

Then, the initial capacity of battery 100 was determined by carrying out charging in the constant current constant voltage (CC-CV) mode and discharging in the CC-CV mode, as specified below.

Charging in CC-CV mode: CC=1 C, CV=4.1 V, cut-off current=0.01 C Discharging in CC-CV mode: CC=1 C, CV=3.0 V, cut-off current=0.01 C Examples 2 to 6

Positive electrode 10 was produced in the same manner as in Example 1 except that the heating duration was changed as specified in Table 1 below. Then, battery 100 including positive electrode 10 was produced.

Examples 7 to 12

Positive electrode 10 was produced in the same manner as in Example 1 except that the concentration of the aqueous solution was changed as specified in Table 1 below. Then, battery 100 including positive electrode 10 was produced.

Values in column "Addition ratio (P, F, S)" in Table 1 below mean the following: for example, "0.05 (P)" in Example 7 means that the addition ratio of P is 0.05 mass %.

Examples 13 to 17

Positive electrode 10 was produced in the same manner as in Example 1 except that the type of the additive was changed as specified in Table 1 below. Then, battery 100 including positive electrode 10 was produced.

Values in columns "Additive (dissolved substance)" and "Concentration" in Table 1 below mean the following, for example, "$NH_4H_2PO_4+NH_4F$" and their concentrations "5+5" in Example 15 mean that the concentration of $NH_4H_2PO_4$ is 5 mass % and the concentration of $NH_4F$ is 5 mass %. Values in column "Addition ratio (P, F, S)" mean the following: for example, "5+5 (P+F)" in Example 15 means that the addition ratio of P is 5 mass % and the addition ratio of F is 5 mass %.

Comparative Example 1

Positive electrode 10 was produced in the same manner as in Example 1 except that Al foil 1 was heated in ion-exchanged water and thereby Al hydrated oxide film 2 was formed. Then, battery 100 including positive electrode 10 was produced.

Comparative Example 2

Positive electrode 10 was produced in the same manner as in Example 1 except that triethanolamine [$N(CH_2CH_2OH)_3$] was used as an additive and the concentration of the additive was 1 mass %. Then, battery 100 including positive electrode 10 was produced.

Comparative Example 3

Positive electrode 10 was produced in the same manner as in Example 1 except that a mixture of potassium nitrate ($KNO_3$) and lithium hydroxide (LiOH) was used as an additive. Then, battery 100 including positive electrode 10 was produced.

<Evaluation>
1. Nail Penetration Test

The state of charge (SOC) of battery 100 was adjusted to 100%. A nail was prepared. The nail had a shank diameter of 3 mm and an R value of 1 mm at the tip. The nail was driven into battery 100 at a rate of 1 mm/s. The maximum temperature to which the temperature of battery 100 reached was measured. The maximum temperature refers to the surface temperature of battery 100 measured one second after the nail was driven into battery 100. The maximum temperature is shown in Table 1 below. The lower the maximum temperature determined in the nail penetration test was, the greater the mitigation of heat generation that occurred in the battery upon a short circuit caused by, for example, an impact exerted from outside the battery may have been.

2. Battery Resistance

The SOC of battery 100 was adjusted to 50%. Battery 100 was discharged for ten seconds at a rate of 10 C. The level of voltage drop caused in that ten seconds elapsed after the start of the discharging was measured. Based on the relationship between the level of voltage drop and the rate, the battery resistance was calculated. The battery resistance is shown in Table 1 below

TABLE 1

| | Production method | | | | Positive electrode | | | Evaluation | |
|---|---|---|---|---|---|---|---|---|---|
| | Aqueous solution | | Heating | | Al hydrated oxide film | | | Nail penetration test | Discharge test |
| | Additive (dissolved substance) | Concentration mass % | duration min. | Thickness nm | Addition ratio (P, F, S) mass % | Specific volume resistance $\Omega \cdot cm$ | Dynamic hardness — | Maximum temperature °C | Battery resistance $m\Omega$ |
| Ex. 1 | $NH_4H_2PO_4$ | 10 | 2 | 100 | 10 (P) | $10^8$ | 50 | 250 | 1.65 |
| Ex. 2 | $NH_4H_2PO_4$ | 10 | 1 | 50 | 10 (P) | $10^8$ | 50 | 255 | 1.61 |
| Ex. 3 | $NH_4H_2PO_4$ | 10 | 5 | 300 | 10 (P) | $10^8$ | 50 | 248 | 1.7 |
| Ex. 4 | $NH_4H_2PO_4$ | 10 | 10 | 600 | 10 (P) | $10^8$ | 50 | 245 | 1.71 |
| Ex. 5 | $NH_4H_2PO_4$ | 10 | 20 | 1000 | 10 (P) | $10^8$ | 50 | 244 | 1.72 |
| Ex. 6 | $NH_4H_2PO_4$ | 10 | 60 | 1000 | 10 (P) | $10^8$ | 50 | 244 | 1.72 |
| Ex. 7 | $NH_4H_2PO_4$ | 0.05 | 2 | 100 | 0.05 (P) | $10^{10}$ | 210 | 270 | 1.75 |
| Ex. 8 | $NH_4H_2PO_4$ | 0.1 | 2 | 100 | 0.1 (P) | $10^{10}$ | 200 | 253 | 1.68 |
| Ex. 9 | $NH_4H_2PO_4$ | 1 | 2 | 100 | 1 (P) | $10^9$ | 100 | 251 | 1.67 |
| Ex. 10 | $NH_4H_2PO_4$ | 5 | 2 | 100 | 5 (P) | $5 \times 10^8$ | 75 | 250 | 1.66 |
| Ex. 11 | $NH_4H_2PO_4$ | 20 | 2 | 100 | 20 (P) | $10^7$ | 25 | 250 | 1.64 |
| Ex. 12 | $NH_4H_2PO_4$ | 30 | 2 | 100 | 30 (P) | $10^8$ | 10 | 250 | 1.63 |
| Ex. 13 | $NH_4F$ | 10 | 2 | 100 | 10 (F) | $10^8$ | 25 | 240 | 1.65 |

TABLE 1-continued

| | Production method | | | | Positive electrode | | | Evaluation | |
| | Aqueous solution | | Heating | | Al hydrated oxide film | | | Nail penetration test | Discharge test |
| | Additive (dissolved substance) | Concentration mass % | duration min. | Thickness nm | Addition ratio (P, F, S) mass % | Specific volume resistance $\Omega \cdot cm$ | Dynamic hardness — | Maximum temperature °C. | Battery resistance $m\Omega$ |
|---|---|---|---|---|---|---|---|---|---|
| Ex. 14 | $(NH_4)_2SO_4$ | 10 | 2 | 100 | 10 (S) | $5 \times 10^8$ | 150 | 252 | 1.66 |
| Ex. 15 | $NH_4H_2PO_4$ + $NH_4F$ | 5 + 5 | 2 | 100 | 5 + 5 (P + F) | $10^8$ | 38 | 245 | 1.65 |
| Ex. 16 | $NH_4H_2PO_4$ + $(NH_4)_2SO_4$ | 5 + 5 | 2 | 100 | 5 + 5 (P + S) | $2.5 \times 10^8$ | 100 | 251 | 1.65 |
| Ex. 17 | $NH_4H_2PO_4$ + $NH_4F$ + $(NH_4)_2SO_4$ | 1/3 + 1/3 + 1/3 | 2 | 100 | 1/3 + 1/3 + 1/3 (P + F + S) | $1.7 \times 10^8$ | 57 | 248 | 1.65 |
| Comp. Ex. 1 | — | 0 | 2 | 100 | 0 | $10^{12}$ | 250 | 300 | 1.85 |
| Comp. Ex. 2 | $N(CH_2CH_2OH)_3$ | 1 | 2 | 150 | 0 | $10^{12}$ | 250 | 290 | 1.88 |
| Comp. Ex. 3 | $KNO_3$ + LiOH | 8 + 2 | 2 | 100 | 10 (N) | $10^{12}$ | 300 | 350 | 1.95 |

<Results>

1. Example 1, Comparative Example 1

The thickness of Al hydrated oxide film 2 in Example 1 was substantially the same as that of Al hydrated oxide film 2 in Comparative Example 1. The maximum temperature in Example 1 was lower than that in Comparative Example 1. Al hydrated oxide film 2 of Example 1 contained an additive element (P). The dynamic hardness in Example 1 was lower than that in Comparative Example 1. Probably, the additive element in Example 1 caused structural defects in Al hydrated oxide film 2 and thereby rendered Al hydrated oxide film 2 flexible; as a result, Al hydrated oxide film 2 had impact strength and thereby the maximum temperature was low.

The battery resistance in Example 1 was lower than that in Comparative Example 1. It may be because the structural defects caused a decrease in the specific volume resistance of Al hydrated oxide film 2.

2. Examples 1 to 6

Results of Examples 1 to 6 in Table 1 above illustrate the following tendency: the longer the heating duration was, the greater the thickness of Al hydrated oxide film 2 was. It should be noted that the thickness of Al hydrated oxide film 2 may have reached its maximum value in about 20 minutes (Examples 5 and 6).

Figure 9:
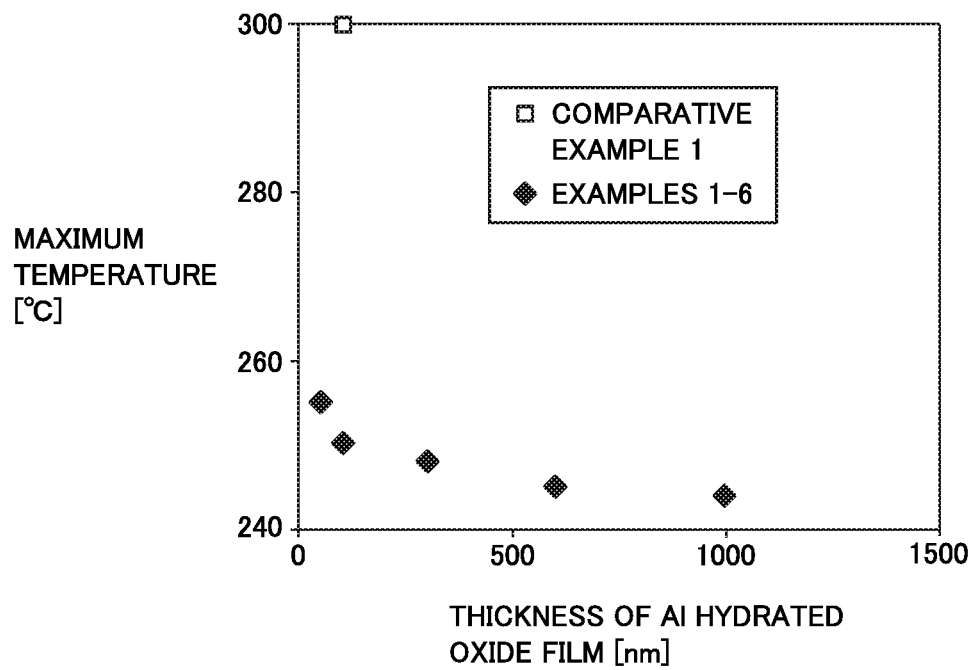
FIG. 9 is a graph illustrating the relationship between the thickness of the aluminum hydrated oxide film and the maximum temperature.

FIG. 9 is a graph illustrating the relationship between the thickness of the aluminum hydrated oxide film and the maximum temperature.

In Examples 1 to 6, the thickness of Al hydrated oxide film 2 was not smaller than 50 nm and not greater than 1000 nm. With the thickness being not smaller than 100 nm, the maximum temperature tended to be low.

Figure 10:
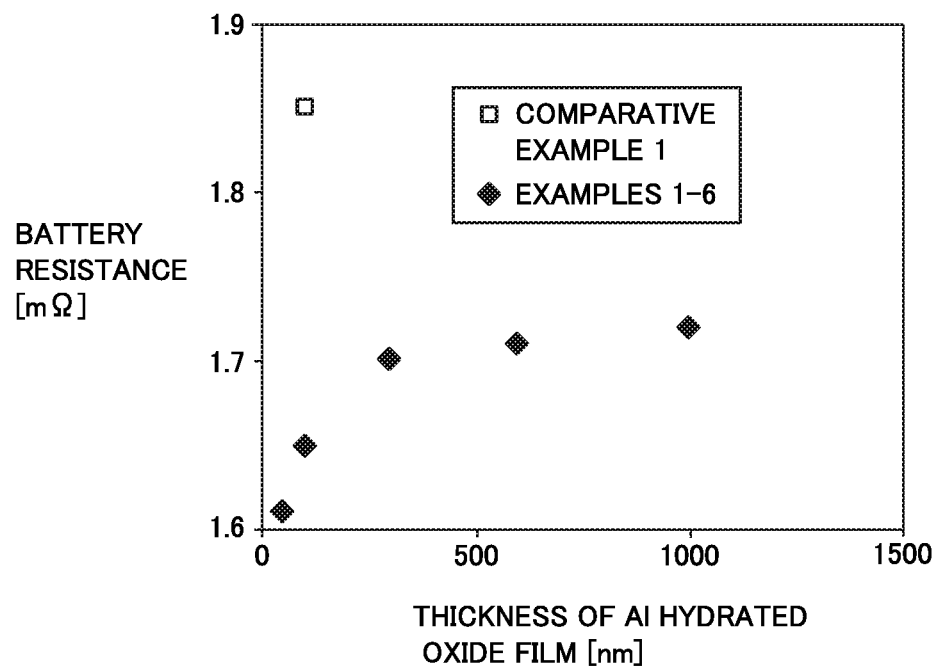
FIG. 10 is a graph illustrating the relationship between the thickness of the aluminum hydrated oxide film and battery resistance.

FIG. 10 is a graph illustrating the relationship between the thickness of the aluminum hydrated oxide film and battery resistance.

In Examples 1 to 6, the greater the thickness of Al hydrated oxide film 2 was, the higher the battery resistance tended to be. But even with the thickness of Al hydrated oxide film 2 being as great as 1000 nm, the battery resistance in Examples 1 to 6 was still lower than that in Comparative Example 1. It may be because the structural defects caused a decrease in the specific volume resistance of Al hydrated oxide film 2. With the thickness being not greater than 600 nm, the battery resistance tended to be low.

3. Example 1, Examples 7 to 12, Comparative Example 1

Figure 11:
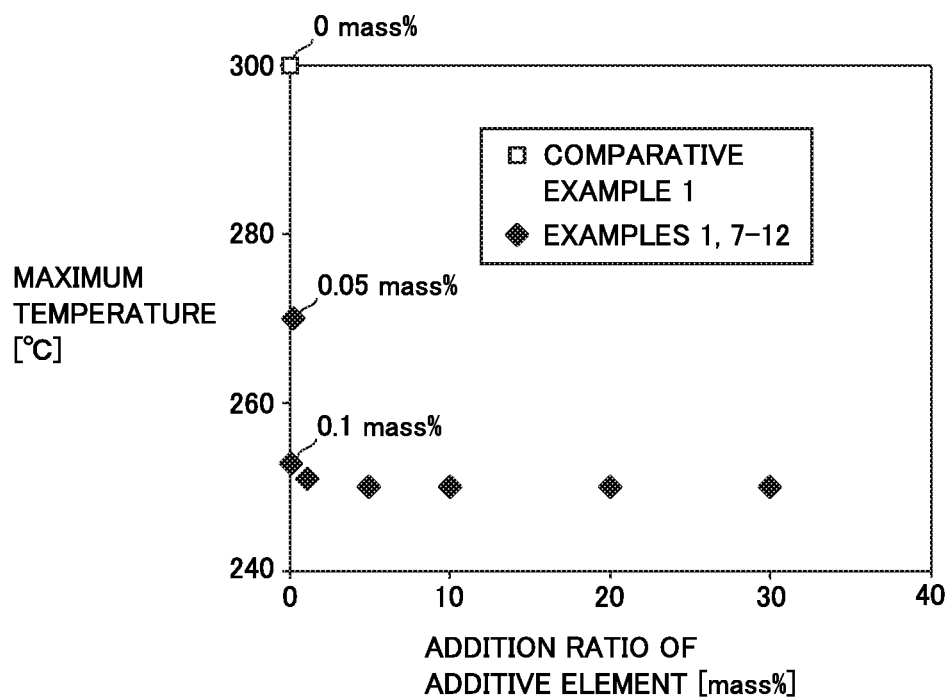
FIG. 11 is a graph illustrating the relationship between the addition ratio of an additive element and the maximum temperature.

FIG. 11 is a graph illustrating the relationship between the addition ratio of the additive element and the maximum temperature.

With the addition ratio being not lower than 0.1 mass %, the maximum temperature tended to be low. The heat-generation-mitigating effect attributable to the additive element may have saturated when the addition ratio was about 5 mass %.

Figure 12:
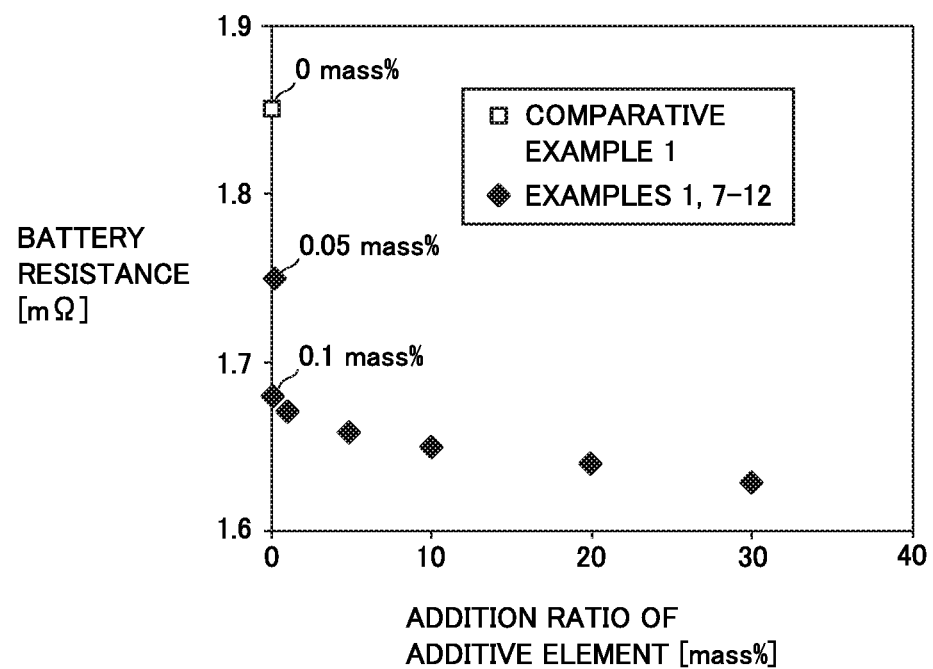
FIG. 12 is a graph illustrating the relationship between the addition ratio of an additive element and battery resistance.

FIG. 12 is a graph illustrating the relationship between the addition ratio of the additive element and battery resistance.

With the addition ratio being not lower than 0.1 mass %, the battery resistance tended to be low.

4. Example 1, Examples 13 to 17, Comparative Examples 2 and 3

Triethanolamine (Comparative Example 2) may have the action of promoting the growth of Al hydrated oxide film 2, but triethanolamine seems to have no effect of decreasing the dynamic hardness or no effect of decreasing the specific volume resistance. Comparative Examples 1 and 2 had similar levels of dynamic hardness and therefore may have had similar levels of maximum temperature. Comparative Examples 1 and 2 had similar levels of specific volume resistance and therefore may have had similar levels of battery resistance.

In Examples, N contained in the additive may have volatilized as ammonia and therefore substantially no N may have been introduced into Al hydrated oxide film 2. In Comparative Example 3, N may have been introduced into Al hydrated oxide film 2. In Comparative Example 3, however, the N introduction caused an increase in the dynamic hardness. This increase may have been the cause of the increase in the maximum temperature.

The additive element (P, F, and S), which was used in Examples, may have a tendency to capture oxygen radicals and this tendency may have been the cause of the increase in the heat-generation-mitigating effect. Among Examples 1, 13, and 14, Example 13 had the lowest maximum temperature Based on this result, F (among P, F, and S) may have had the greatest tendency to capture oxygen radicals.

The physical properties of Al hydrated oxide film 2 containing two or more types of the additive element (in Example 15, for example) tended to be similar to the average of the physical properties of respective Al hydrated oxide films 2 each of which contained one additive element (in Examples 1 and 13, for example). For example, the dynamic hardness in Example 15 was 38; the dynamic hardness in Example 1 was 50; the dynamic hardness in Example 13 was 25; and the average of the dynamic hardness in Example 1 and the dynamic hardness in Example 13 was 37.5.

The embodiments and examples disclosed herein are illustrative and non-restrictive in any respect. The technical scope indicated by the claims is intended to include any modifications within the scope and meaning equivalent to the terms of the claims.

What is claimed is:

1. A positive electrode for a non-aqueous electrolyte secondary battery, the positive electrode comprising at least:
   a positive electrode current collector; and
   a positive electrode active material layer,
   the positive electrode current collector comprising an aluminum foil and an aluminum hydrated oxide film,
   the aluminum hydrated oxide film covering a surface of the aluminum foil,
   the positive electrode active material layer being formed on a surface of the aluminum hydrated oxide film,
   the aluminum hydrated oxide film having a thickness not smaller than 50 nm and not greater than 1000 nm,
   the aluminum hydrated oxide film containing at least one selected from the group consisting of phosphorus, fluorine, and sulfur,
   wherein a ratio of a total mass of the at least one selected from the group consisting of phosphorus, fluorine, and sulfur contained in the aluminum hydrated oxide film to a sum of a total mass of the at least one selected from the group consisting of phosphorus, fluorine, and sulfur contained in the aluminum hydrated oxide film and the mass of aluminum contained in the aluminum hydrated oxide film is not lower than 0.05 mass % and not greater than 30 mass %.

2. The positive electrode according to claim 1, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass %.

3. The positive electrode according to claim 1, wherein the aluminum hydrated oxide film has a thickness not smaller than 100 nm.

4. A non-aqueous electrolyte secondary battery comprising at least the positive electrode according to claim 1 and a negative electrode.

5. A method of producing positive the positive electrode according to claim 1, the method comprising at least:
   preparing the aluminum foil;
   forming the aluminum hydrated oxide film on the surface of the aluminum foil by heating the aluminum foil in an aqueous solution to produce the positive electrode current collector; and
   forming the positive electrode active material layer on the surface of the aluminum hydrated oxide film to produce the positive electrode,
   the aqueous solution containing at least one selected from the group consisting of the phosphorus compound, the fluorine compound, and the sulfur compound dissolved in the aqueous solution.

6. The method according to claim 5, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 20 mass %.

7. The method according to claim 5, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 10 mass %.

8. The method according to claim 5, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 5 mass %.

9. The method according to claim 5, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 1 mass % and not greater than 5 mass %.

10. The positive electrode according to claim 1, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 20 mass %.

11. The positive electrode according to claim 1, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 10 mass %.

12. The positive electrode according to claim 1, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 0.1 mass % and not greater than 5 mass %.

13. The positive electrode according to claim 1, wherein the ratio of the total mass of the at least one selected from the group consisting of phosphorus, fluorine, and sulfur contained in the aluminum hydrated oxide film to the sum of the total mass of the at least one selected from the group consisting of phosphorus, fluorine, and sulfur contained in the aluminum hydrated oxide film and the mass of aluminum contained in the aluminum hydrated oxide film is not lower than 1 mass % and not greater than 5 mass %.

14. The positive electrode according to claim 1, wherein the aluminum hydrated oxide film consists of aluminum hydrated oxide and at least one selected from the group consisting of aluminum phosphate, aluminum fluoride, and aluminum sulfate.

15. The positive electrode according to claim 1, wherein the aluminum hydrated oxide film contains aluminum hydrated oxide and at least two selected from the group consisting of aluminum phosphate, aluminum fluoride, and aluminum sulfate.

16. The positive electrode according to claim 1, wherein the aluminum hydrated oxide film contains aluminum hydrated oxide, aluminum phosphate, aluminum fluoride, and aluminum sulfate.

17. The positive electrode according to claim 1, wherein the aluminum hydrated oxide film contains at least two selected from the group consisting of phosphorus, fluorine, and sulfur.

18. The positive electrode according to claim 1, wherein the aluminum hydrated oxide film contains phosphorus, fluorine, and sulfur.

19. The positive electrode according to claim 1, wherein the aluminum hydrated oxide film contains aluminum hydrated oxide in an amount not lower than 70 mass %.

20. The positive electrode according to claim 1, wherein the aluminum hydrated oxide film contains aluminum hydrated oxide in an amount not lower than 80 mass %.

* * * * *